United States Patent
Zhu et al.

(10) Patent No.: US 11,182,516 B2
(45) Date of Patent: Nov. 23, 2021

(54) METHOD FOR OPTIMIZING ROTATION ANGLE OF OUTLET OF ATOMIZING NOZZLE

(71) Applicant: JIANGSU UNIVERSITY, Zhenjiang (CN)

(72) Inventors: Xingye Zhu, Zhenjiang (CN); Shouqi Yuan, Zhenjiang (CN); Junping Liu, Zhenjiang (CN); Fordjour Alexander, Zhenjiang (CN); Keji Lu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/257,320

(22) PCT Filed: Apr. 24, 2020

(86) PCT No.: PCT/CN2020/086576
§ 371 (c)(1),
(2) Date: Dec. 31, 2020

(87) PCT Pub. No.: WO2021/159605
PCT Pub. Date: Aug. 19, 2021

(65) Prior Publication Data
US 2021/0256178 A1 Aug. 19, 2021

(30) Foreign Application Priority Data
Feb. 10, 2020 (CN) .......................... 202010084432.0

(51) Int. Cl.
*G06F 30/17* (2020.01)
*G06F 30/28* (2020.01)
(Continued)

(52) U.S. Cl.
CPC ................ *G06F 30/17* (2020.01); *B05B 3/02* (2013.01); *G06F 30/28* (2020.01); *G06F 2113/08* (2020.01)

(58) Field of Classification Search
CPC . B05B 3/02; G06F 30/17; G06F 30/28; G06F 2113/08
See application file for complete search history.

(56) References Cited

U.S. PATENT DOCUMENTS 5,607,108 A    3/1997   Garlick et al.
9,211,019 B2 *   12/2015   Driscoll, Jr. ......... A47C 27/082
(Continued)

FOREIGN PATENT DOCUMENTS

CN    202087462 U    12/2011
CN    203291986 U    11/2013
(Continued)

OTHER PUBLICATIONS

Li, J. & Kawano, H. "Sprinkler Performance as Affected by Nozzle Inner Contraction Angle" Irrigation Science, vol. 18, pp. 63-66 (1998) (Year: 1998).*

(Continued)

*Primary Examiner* — Jay Hann
(74) *Attorney, Agent, or Firm* — Bayramoglu Law Offices LLC

(57) ABSTRACT

A method for optimizing a rotation angle of an outlet of an atomizing nozzle is provided. The atomizing nozzle includes a nozzle core and a nozzle body. The method includes the following steps: measuring an outlet flow rate $Q_0$ of the atomizing nozzle under a rated working pressure when an outlet clearance between the nozzle core and the nozzle body is δ=0; setting the outlet clearance between the nozzle core and the nozzle body by changing a phase angle between the nozzle core and the nozzle body, and measuring an outlet (Continued)

flow rate $Q_1$ of the atomizing nozzle in a stable working state under the rated working pressure; calculating a flow coefficient of the atomizing nozzle; calculating the outlet clearance of the atomizing nozzle according to an expected outlet flow rate $Q_2$ of the atomizing nozzle and the flow coefficient of the atomizing nozzle.

4 Claims, 1 Drawing Sheet

(51) Int. Cl.
    *B05B 3/02*          (2006.01)
    *G06F 113/08*      (2020.01)

(56) References Cited

U.S. PATENT DOCUMENTS

| | | | |
|---|---|---|---|
| 9,682,387 B2* | 6/2017 | Alexander | B05B 1/3426 |
| 2005/0072483 A1* | 4/2005 | Rioufol | F16L 15/001 |
| | | | 138/104 |
| 2007/0029408 A1 | 2/2007 | Hewitt | |
| 2017/0028428 A1* | 2/2017 | Cote | B05B 1/04 |

FOREIGN PATENT DOCUMENTS

| | | |
|---|---|---|
| CN | 206068164 U | 4/2017 |
| CN | 207533429 U | 6/2018 |
| CN | 108348931 A | 7/2018 |
| CN | 208380636 U | 1/2019 |
| CN | 209138901 U | 7/2019 |

OTHER PUBLICATIONS

Zhu, X., et al. "Effect of Sprinkler Head Geometrical Parameters on Hydraulic Performance of Fluidic Sprinkler" J. Irrigation & Drainage Engineering, vol. 138, No. 11, pp. 1019-1026 (2012) (Year: 2012).*
Dwomoh, F., et al. "Sprinkler Rotation and Water Application Rate for the Newly-Designed Complete Fluidic Sprinkler and Impact Sprinkler" Int. J. Agric. & Biological Engineering, vol. 7, No. 4, pp. 38-46 (2014) (Year: 2014).*
Zhu, X., et al. "Evaluation of Hydraulic Performance Characteristics of a Newly Designed Dynamic Fluidic Sprinkler" Water, vol. 10, 1301, 15 pages (2018) (Year: 2018).*
Lesmeister, C. "Assessment of the 'Catch-Can' Test for Measuring Lawn Sprinkler Application Rates" Master's Dissertation, U. Wyoming (2004) (Year: 2004).*

* cited by examiner

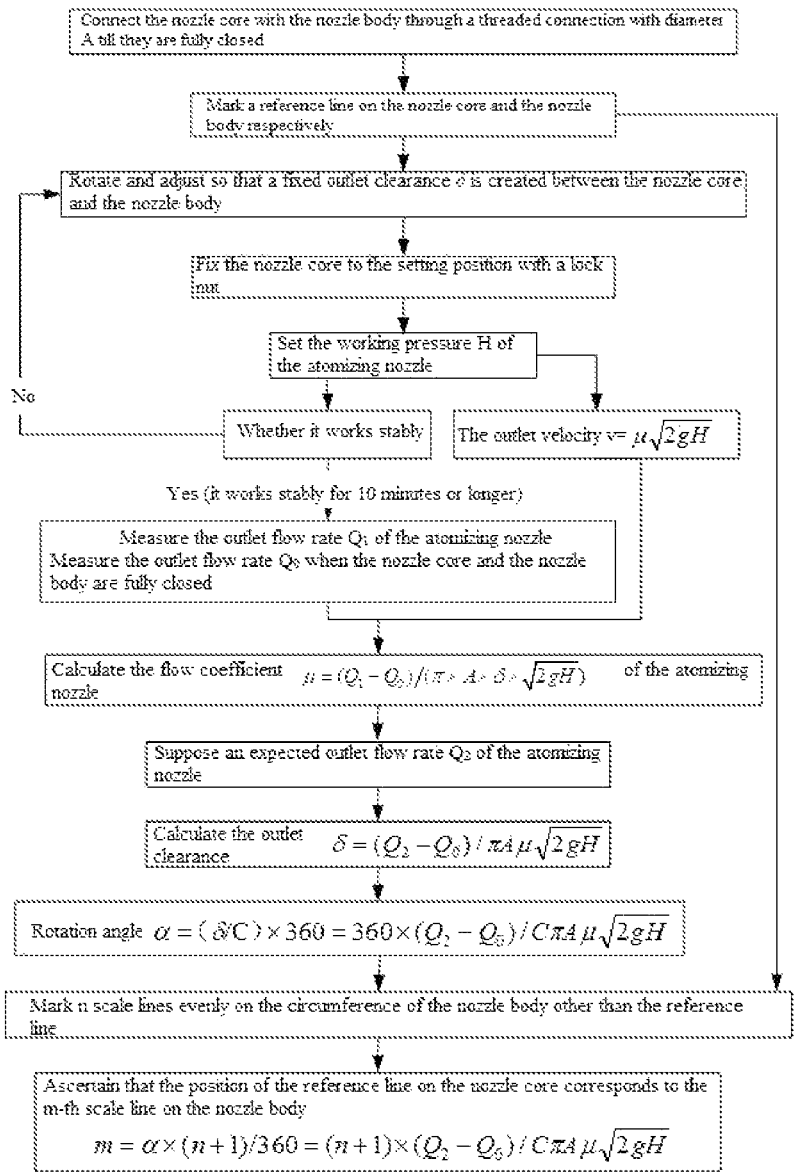

METHOD FOR OPTIMIZING ROTATION ANGLE OF OUTLET OF ATOMIZING NOZZLE

CROSS REFERENCE TO THE RELATED APPLICATIONS

This application is the national stage entry of International Application No. PCT/CN2020/086576, filed on Apr. 24, 2020, which is based upon and claims priority to Chinese Patent Application No. 202010084432.0, filed on Feb. 10, 2020, the entire contents of which are incorporated herein by reference.

TECHNICAL FIELD

The present invention relates to the field of atomizing nozzle structure optimization, particularly to a method for optimizing a rotation angle of an outlet of an atomizing nozzle.

BACKGROUND

Atomizing nozzles are water-saving irrigation devices widely applied in agricultural irrigation. A stable working state of the atomizing nozzle in the working process is a state in which uniform spraying is maintained around the outlet of the atomizing nozzle within the spraying coverage and a good atomization effect is achieved. If the outlet flow rate is too low, water may be absent in some places within the spraying coverage of the atomizing nozzle while other places within the spraying coverage receive water, resulting in a non-uniform spraying effects around the outlet of the atomizing nozzle; if the outlet flow rate of the atomizing nozzle is too large, excessively big water droplets will be sprayed within the spraying coverage, and the atomization effect will be poor. At present, the outlet area design of atomizing nozzles mainly relies on experience in the researches, and observing whether the atomizing nozzle can work stably. Therefore, it is unable to carry out optimization design of the outlet flow rate of atomizing nozzle accurately and ensure that the atomizing nozzle can work stably; moreover, it is unable to ascertain the rule of the influence of the outlet flow rate on the important hydraulic performance. If the atomizing nozzle can't work stably or the important hydraulic performance is poor under some special circumstances, it is unable to analyze whether the problem is caused by the outlet flow rate or not. Consequently, it is unable to effectively solve the technical problem.

As described above, in the case that the atomizing nozzle can't work stably or the important hydraulic performance is poor, it is unable to effectively solve the problem by setting the parameters of the outlet structure scientifically to control the outlet flow rate, since it is unable to carry out optimization design for the outlet flow rate of atomizing nozzle in the design process.

SUMMARY

In view of the drawbacks in the prior art, the present invention provides a method for optimizing a rotation angle of an outlet of an atomizing nozzle, which can quickly adjust the rotation angle of the outlet to a proper position to achieve an expected outlet flow rate when the atomizing nozzle sprays.

The above technical object of the present invention is attained with the following technical solutions.

A method for optimizing a rotation angle of an outlet of an atomizing nozzle, wherein the atomizing nozzle includes a nozzle core and a nozzle body, and the method includes the following steps:

measuring an outlet flow rate $Q_0$ of the atomizing nozzle under a rated working pressure H when an outlet clearance between the nozzle core and the nozzle body is $\delta=0$;

setting the outlet clearance between the nozzle core and the nozzle body to $\delta$ by changing a phase angle $\alpha$ between the nozzle core and the nozzle body, constraining a position of the nozzle core, and measuring an outlet flow rate $Q_1$ of the atomizing nozzle in a stable working state under the rated working pressure H; an area of the outlet of the atomizing nozzle is $S_1 = \pi \times A \times \delta$, wherein A is an inner diameter of the nozzle body or an outer diameter of the nozzle core;

calculating a flow coefficient $\mu$ of the atomizing nozzle based on the following formula:

$$(Q_1 - Q_0) = (S_1 - S_0) \times v = \pi \times A \times \delta \times \mu \times \sqrt{2gH},$$

wherein:

v is an outlet flow velocity of the atomizing nozzle, and $v = \mu\sqrt{2gH}$;

$S_0$ is the area of the outlet of the atomizing nozzle when the outlet clearance is $\delta=0$, and $S_0=0$;

$\mu$ is the flow coefficient of the atomizing nozzle, and $\mu = (Q_1 - Q_0)/(\pi \times A \times \delta \times \sqrt{2gH})$;

calculating the outlet clearance $\delta_2$ of the atomizing nozzle according to an expected outlet flow rate $Q_2$ of the atomizing nozzle and the flow coefficient $\mu$ of the atomizing nozzle, wherein $\delta_2 = (Q_2 - Q_0)/\pi A \mu \sqrt{2gH}$; and according to an assembly relationship between the nozzle core and the nozzle body, setting the outlet clearance between the nozzle core and the nozzle body to $\delta_2$ by changing the phase angle between the nozzle core and the nozzle body to $\alpha_2$.

Furthermore, during measurement of the outlet flow rate $Q_1$ of the atomizing nozzle in the stable working state under the rated working pressure H, when the atomizing nozzle cant be maintained in the stable working state, the nozzle core is released from the constrained state, the phase angle between the nozzle core and the nozzle body is increased so as to increase the outlet clearance between the nozzle core and the nozzle body, then the position of the nozzle core is constrained, and the measurement is performed again, till the atomizing nozzle remains in the stable working state for at least 10 minutes.

Furthermore, the assembly relationship between the nozzle core and the nozzle body is a threaded connection with a nominal diameter B and a pitch C, and the phase angle $\alpha_2$ between the nozzle core and the nozzle body that needs to become for setting the outlet clearance between the nozzle core and the nozzle body to $\delta_2$ is calculated as follows:

$$\alpha_2 = (\delta_2/C) \times 360 = 360 \times (Q_2 - Q_0)/C \pi A \mu \sqrt{2gH}.$$

Furthermore; the method further includes the following steps:

marking reference lines on the nozzle core and the nozzle body individually when the outlet clearance between the nozzle core and the nozzle body is $\delta=0$;

marking several evenly distributed scale lines on an outer circumferential surface of the nozzle body, starting from the reference line; and based on the phase angle $\alpha_2$ between the nozzle core and the nozzle body that needs to become, rotating the nozzle core so that the reference line on the nozzle core aligns to the respective one of the scale lines on the nozzle body.

The present invention attains the following beneficial effects:

1. With the method for optimizing the rotation angle of the outlet of an atomizing nozzle provided by the present invention, the error between the measured outlet flow rate and the expected outlet flow rate is smaller than 10%, as measured in tests.

2. The method for optimizing the rotation angle of the outlet of an atomizing nozzle provided by the present invention utilizes reference lines and scale lines in combination, and has advantages including simple and quick operation and high accuracy, and can realize optimization of the rotation angle of the outlet of the atomizing nozzle at low cost.

BRIEF DESCRIPTION OF THE DRAWINGS

FIGURE is a flow chart of the method for optimizing a rotation angle of an outlet of an atomizing nozzle according to the present invention.

DETAILED DESCRIPTION OF THE EMBODIMENTS

Hereunder the present invention will be further detailed in embodiments with reference to the accompanying drawings, but the protection scope of the present invention is not limited to those embodiments.

As shown in the FIGURE, the method for optimizing the rotation angle of the outlet of an atomizing nozzle provided in the present invention includes the following steps:

setting the outer diameter of the nozzle core and the inner diameter of the nozzle body to 20 mm, connecting the nozzle core with the nozzle body through a threaded connection with 6 mm nominal diameter and 1 mm pitch till the nozzle core and the nozzle body are fully closed, and marking a reference line on the nozzle core and the nozzle body to represent the setting position of 0°; measuring the outlet flow rate $Q_0$ when the nozzle core and the nozzle body are fully closed and obtaining the measured the outlet flow rate $Q_0=0.145$ m³/h, rotating the nozzle core till the angle $\alpha$ between the nozzle core and the nozzle body with reference to the setting position is 90', at which the outlet clearance $\delta$ between the nozzle core and the nozzle body is $1\times90/360=0.25$ mm; then fixing the setting position of the nozzle core with a lock nut to ensure that the outlet clearance $\delta$ remains constant when the atomizing nozzle works;

setting the working pressure of the atomizing nozzle to 0.2. MPa (i.e., 20 m water head), and keeping the atomizing nozzle in a stable working state; measuring the outlet flow rate $Q_1$ of the atomizing nozzle by tests after the atomizing nozzle works stably for 20 minutes and obtaining outlet flow rate $Q_1=0.171$ m³/h, calculating the area $S_1$ of the outlet of the atomizing nozzle: $\delta_1=314\times20\times0.25=15.7$ mm²$=1.57\times10^{-3}$ m²; calculating the outlet flow velocity v of the atomizing nozzle: $v=\mu\sqrt{2\times9.8\times20}=19.8^\mu$ m/s; calculating the flow coefficient $\mu$ of the atomizing nozzle based on the following formula:

$$(Q_1-Q_0)=(S_1-S_0)\times v=\pi\times A\times\delta\times\mu\times\sqrt{2gH},$$

where:

v is the outlet flow velocity of the atomizing nozzle, and $v=\mu\sqrt{2gH}$;

$S_0$ is the area of the outlet of the atomizing nozzle when the outlet clearance is $\delta=0$, and $S_0=0$;

$\mu$ is the flow coefficient of the atomizing nozzle, and $\mu=(Q_1-Q_0)/(\pi\times A\times\delta\times\sqrt{2gH})$;

calculating the flow coefficient $\mu$ of the atomizing nozzle, where $\mu=(0.171-0.145)/(1.57\times10^{-5}\times19.8\times3600)=0.023$.

calculating the outlet clearance $\delta_2$ of the atomizing nozzle according to an expected outlet flow rate $Q_2$ of the atomizing nozzle and the flow coefficient $\mu$ of the atomizing nozzle, where $\delta_2=(Q_2-Q_0)/\pi A\mu\sqrt{2gH}$; setting the outlet clearance between the nozzle core and the nozzle body to $\delta_2$ by changing the phase angle between the nozzle core and the nozzle body to $\alpha_2$ according to the assembly relationship between the nozzle core and the nozzle body. The assembly relationship between the nozzle core and the nozzle body is a threaded connection with a nominal diameter B and a pitch C, and the phase angle $\alpha_2$ between the nozzle core and the nozzle body that needs to become for setting the outlet clearance between the nozzle core and the nozzle body to $\delta_2$ is calculated as follows:

$$\alpha_2=(\delta_2/C)\times360=360\times(Q_2-Q_0)/C\pi A\mu\sqrt{2gH}.$$

marking scale lines in a number of n evenly on the nozzle body with 360° range of the circumference other than the reference line and marking the scale lines with scale, wherein the angle between every two adjacent scale lines is $360(n+1)$ degrees; the number n of the scale lines marked evenly are greater than or equal to 1; by calculating the phase angle $\alpha_2$ between the nozzle core and the nozzle body that needs to become, determining the m-th scale line on the nozzle body corresponding to the position of the reference line on the nozzle core, where $m=\alpha_2\times(n+1)/360$.

Hereunder specific example is given: scale lines in the number of 35 are marked evenly on the nozzle body within 360° range of the circumference other than the reference line; wherein the angle between every two adjacent scale lines is 10°, Based on the flow coefficient $\mu=0.023$ of the atomizing nozzle, at 0.2 MPa, working pressure, suppose the expected outlet flow rate $Q_2$ of the atomizing nozzle is 015, 0.18, 0.21, 0.24 and 0.27 m³/h respectively, the rotation angle of the atomizing nozzle is optimized. The results of rotation angle optimization and the comparison between the outlet flow rate measured in the test and the expected outlet flow rate are shown in the following Table 1.

TABLE 1

Comparison between Experimental Data and Theoretical Calculation Result

| Supposed expected outlet flow rate $Q_2$ (m³/h) | Outlet clearance $\delta$ (mm) | Rotation angle $\alpha$ (°) | Outlet flow rate $Q_{test}$ measured in test (m³/h) | Error between measured outlet flow rate in test and expected outlet flow rate (%) |
|---|---|---|---|---|
| 0.15 | 0.048 | 17 | 0.147 | 2 |
| 0.18 | 0.337 | 121 | 0.170 | 5.6 |
| 0.21 | 0.625 | 225 | 0.203 | 3.3 |
| 0.24 | 0.913 | 329 | 0.226 | 5.8 |
| 0.27 | 1.202 | 433 | 0.248 | 8.1 |

As shown in the above table, with the method for optimizing the rotation angle of the outlet of an atomizing nozzle provided by the present invention, the error between the measured outlet flow rate in test and the expected outlet flow rate is within 10%. Therefore, the method provided by the present invention has advantages including simple and quick operation and high accuracy, and can realize optimization of the rotation angle of the outlet of the atomizing nozzle at low cost.

In order to ensure the accuracy of the experiment, the outlet flow rate $Q_1$ of the atomizing nozzle in a stable working state under rated working pressure H is measured, wherein the stable working state of the atomizing nozzle is a state in which the spraying around the outlet is uniform within the spraying coverage and the atomization effect is good. When the atomizing nozzle can't be maintained in the stable working state, the nozzle core is released from the constrained state, and the phase angle between the nozzle core and the nozzle body is increased, so that the outlet clearance between the nozzle core and the nozzle body is increased; then the position of the nozzle core is constrained again. In view that the operation of the atomizing nozzle may have fluctuations and is not stable enough at the beginning of the operation, the outlet flow rate $Q_1$ is not measured before the atomizing nozzle operates stably at the rated working pressure for 10 minutes.

While some preferred embodiments of the present invention are described above, the present invention is not limited to those embodiments. Any obvious improvement, replacement, or variation that can be made by those skilled in the art without departing from the spirit of the present invention shall be deemed as falling in the protection scope of the present invention.

What is claimed is:

1. A method for optimizing a rotation angle of an outlet of an atomizing nozzle, wherein the atomizing nozzle comprising a nozzle core and a nozzle body, the method comprises the following steps:
    measuring an outlet flow rate $Q_0$ of the atomizing nozzle under a rated working pressure H when an outlet clearance between the nozzle core and the nozzle body is $\delta=0$;
    setting the outlet clearance between the nozzle core and the nozzle body to $\delta$ by changing a phase angle $\alpha$ between the nozzle core and the nozzle body, constraining a position of the nozzle core, and measuring an outlet flow rate $Q_1$ of the atomizing nozzle in a stable working state under the rated working pressure H; an area of the outlet of the atomizing nozzle is $S_1=\pi \times A \times \delta$, wherein A is an inner diameter of the nozzle body or an outer diameter of the nozzle core;
    calculating a flow coefficient $\mu$ of the atomizing nozzle based on the following formula:

$(Q_1-Q_0)=(S_1-S_0)\times v=\pi \times A \times \delta \times \mu \times \sqrt{2gH}$, wherein:
v is an outlet flow velocity of the atomizing nozzle, and $v=\mu\sqrt{2gH}$;
$S_0$ is the area of the outlet of the atomizing nozzle when the outlet clearance is $\delta=0$, and $S_0=0$;
$\mu$ is the flow coefficient of the atomizing nozzle, and $\mu=(Q_1-Q_0)/(\pi \times A \times \delta \times \sqrt{2gH})$, and
g is the acceleration due to gravity;
calculating the outlet clearance $\delta_2$ of the atomizing nozzle according to an expected outlet flow rate $Q_2$ of the atomizing nozzle and the flow coefficient $\mu$ of the atomizing nozzle, wherein $\delta_2=(Q_2-Q_0)/\pi A\mu\sqrt{2gH}$; and
according to an assembly relationship between the nozzle core and the nozzle body, setting the outlet clearance between the nozzle core and the nozzle body to $\delta_2$ by changing the phase angle $\alpha$ between the nozzle core and the nozzle body to a second phase angle $\alpha_2$; and
wherein during the step of measuring the outlet flow rate $Q_1$ of the atomizing nozzle in the stable working state under the rated working pressure H, when the atomizing nozzle is not maintained in the stable working state, the nozzle core is released from a constrained state, the phase angle $\alpha$ between the nozzle core and the nozzle body is increased to increase the outlet clearance between the nozzle core and the nozzle body.

2. The method according to claim 1, wherein during the step of the phase angle $\alpha$ between the nozzle core and the nozzle body being increased to increase the outlet clearance between the nozzle core and the nozzle body, the position of the nozzle core is then constrained, and the outlet flow rate $Q_1$ of the atomizing nozzle is measured again until the atomizing nozzle remains in the stable working state for at least 10 minutes.

3. The method according to claim 1, wherein the assembly relationship between the nozzle core and the nozzle body is a threaded connection with a nominal diameter B and a pitch C, and the phase angle $\alpha_2$ between the nozzle core and the nozzle body for setting the outlet clearance between the nozzle core and the nozzle body to $\delta_2$ is calculated as follows:

$\alpha_2=(\delta_2/C)\times 360=360\times(Q_2-Q_0)/C\pi A\mu\sqrt{2gH}$.

4. The method according to claim 1, further comprising the following steps:
    marking reference lines on the nozzle core and the nozzle body individually when the outlet clearance between the nozzle core and the nozzle body is $\delta=0$;
    marking several evenly distributed scale lines on an outer circumferential surface of the nozzle body, starting from a reference line of the reference lines; and
    based on the phase angle $\alpha_2$ between the nozzle core and the nozzle body; rotating the nozzle core, the reference line on the nozzle core is configured to be aligned to a respective scale line of the several evenly distributed scale lines on the nozzle body.

* * * * *